(12) United States Patent
Zhang et al.

(10) Patent No.: US 9,650,448 B2
(45) Date of Patent: May 16, 2017

(54) FORMATION OF A ZIEGLER-NATTA CATALYST

(71) Applicant: FINA TECHNOLOGY, INC., Houston, TX (US)

(72) Inventors: Lei Zhang, League City, TX (US); David J. Rauscher, Longview, TX (US)

(73) Assignee: Fina Technology, Inc., Houston, TX (US)

(*) Notice: Subject to any disclaimer, the term of this patent is extended or adjusted under 35 U.S.C. 154(b) by 404 days.

(21) Appl. No.: 14/304,328

(22) Filed: Jun. 13, 2014

(65) Prior Publication Data

US 2015/0361187 A1 Dec. 17, 2015

(51) Int. Cl.
- C08F 10/02 (2006.01)
- C08F 4/655 (2006.01)
- C08F 10/00 (2006.01)

(52) U.S. Cl.
CPC ............ C08F 4/6555 (2013.01); C08F 10/00 (2013.01)

(58) Field of Classification Search
None
See application file for complete search history.

(56) References Cited

U.S. PATENT DOCUMENTS

| | | | |
|---|---|---|---|
| 4,271,060 A | 6/1981 | Hubby | |
| 4,543,399 A | 9/1985 | Jenkins, III et al. | |
| 4,588,790 A | 5/1986 | Jenkins, III et al. | |
| 5,001,205 A | 3/1991 | Hoel | |
| 5,028,670 A | 7/1991 | Chinh et al. | |
| 5,108,972 A | 4/1992 | Wang et al. | |
| 5,236,998 A | 8/1993 | Lundeen et al. | |
| 5,317,036 A | 5/1994 | Brady, III et al. | |
| 5,352,749 A | 10/1994 | DeChellis et al. | |
| 5,405,922 A | 4/1995 | DeChellis et al. | |
| 5,436,304 A | 7/1995 | Griffin et al. | |
| 5,456,471 A | 10/1995 | MacDonald | |
| 5,462,999 A | 10/1995 | Griffin et al. | |
| 5,525,678 A | 6/1996 | Mink et al. | |
| 5,589,555 A | 12/1996 | Zboril et al. | |
| 5,616,661 A | 4/1997 | Eisinger et al. | |
| 5,627,242 A | 5/1997 | Jacobsen et al. | |
| 5,665,818 A | 9/1997 | Tilston et al. | |
| 5,668,228 A | 9/1997 | Chinh et al. | |
| 5,677,375 A | 10/1997 | Rifi et al. | |
| 5,817,591 A | 10/1998 | Shamshoum et al. | |
| 5,945,366 A | 8/1999 | Kataoka et al. | |
| 6,147,173 A | 11/2000 | Holtcamp | |
| 6,174,971 B1 | 1/2001 | Chen et al. | |
| 6,180,735 B1 | 1/2001 | Wenzel | |
| 6,207,606 B1 | 3/2001 | Lue et al. | |
| 6,211,105 B1 | 4/2001 | Holtcamp | |
| 6,242,545 B1 | 6/2001 | Jejelowo et al. | |
| 6,245,705 B1 | 6/2001 | Kissin | |
| 6,245,868 B1 | 6/2001 | Agapiou et al. | |
| 6,248,845 B1 | 6/2001 | Loveday et al. | |
| 6,271,323 B1 | 8/2001 | Loveday et al. | |
| 6,274,684 B1 | 8/2001 | Loveday et al. | |
| 6,300,436 B1 | 10/2001 | Agapiou et al. | |
| 6,339,134 B1 | 1/2002 | Crowther et al. | |
| 6,340,730 B1 | 1/2002 | Murray et al. | |
| 6,346,586 B1 | 2/2002 | Agapiou et al. | |
| 6,359,072 B1 | 3/2002 | Whaley | |
| 6,380,328 B1 | 4/2002 | McConville et al. | |
| 6,399,837 B1 | 6/2002 | Wilson et al. | |
| 6,420,580 B1 | 7/2002 | Holtcamp et al. | |
| 8,501,653 B2 | 8/2013 | Zhang et al. | |
| 8,592,535 B2 | 11/2013 | Vizzini et al. | |
| 2011/0172379 A1* | 7/2011 | Vizzini | C08F 10/00 526/107 |
| 2011/0263802 A1 | 10/2011 | Zhang et al. | |
| 2012/0046429 A1 | 2/2012 | Zhang et al. | |

OTHER PUBLICATIONS

Rahaman, M et al., "Ceramic Processing" CRC Press; Aug. 7, 2006, p. 203.
International Search Report and Written Opinion issued in Application No. PCT/US2015/035449, dated Sep. 14, 2015, 12 pages.

* cited by examiner

*Primary Examiner* — Catherine S Branch
(74) *Attorney, Agent, or Firm* — Albert Shung

(57) ABSTRACT

The process includes reacting a reaction mixture comprising magnesium ethoxide (Mg(OEt)$_2$), triethylaluminum (TEAl), and 2-ethylhexanol (2-EHOH) to form magnesium 2-ethyl hexyl alkoxide (Mg(2-EHO)$_2$) and contacting Mg(2-EHO)$_2$ in hexane with a first agent to form a reaction product "A." The process further includes contacting the reaction product "A" with a second agent to form a reaction product "B", wherein the second agent includes a transition metal and a halogen. The process further includes contacting the reaction product "B" with a third agent to form a reaction product "C", wherein the third agent includes a first metal halide. In addition, the process includes contacting the reaction product "C" with a fourth agent to form a reaction product "D", wherein the fourth agent includes a second metal halide. The process also includes contacting the reaction product "D" with a fifth agent to form a Ziegler-Natta catalyst, wherein the fifth agent includes an organoaluminum compound.

17 Claims, No Drawings

FORMATION OF A ZIEGLER-NATTA CATALYST

FIELD

This disclosure generally relates to methods of forming Ziegler-Natta catalyst compositions.

BACKGROUND

Ziegler-Natta catalyst systems may be formed from the combination of a metal component (e.g., a catalyst precursor) with one or more additional components, such as a catalyst support, a cocatalyst and/or one or more electron donors, for example.

An example of a Ziegler-Natta catalyst includes a metal component represented by the formula:

$$MR^4_x;$$

wherein M is a transition metal, $R^4$ is a halogen, an alkoxy or a hydrocarboxyl group and x is the valence of the transition metal. For example, x may be from 1 to 4. Such a catalyst system may be used to form polyolefin compositions.

SUMMARY

A process of forming a Ziegler Natta catalyst is disclosed. The process includes reacting a reaction mixture comprising magnesium ethoxide (Mg(OEt)$_2$), triethylaluminum (TEAl), and 2-ethylhexanol (2-EHOH) to form magnesium 2-ethyl hexyl alkoxide (Mg(2-EHO)$_2$) and contacting Mg(2-EHO)$_2$ in hexane with a first agent to form a reaction product "A." The process further includes contacting the reaction product "A" with a second agent to form a reaction product "B", wherein the second agent includes a transition metal and a halogen. The process further includes contacting the reaction product "B" with a third agent to form a reaction product "C", wherein the third agent includes a first metal halide. In addition, the process includes contacting the reaction product "C" with a fourth agent to form a reaction product "D", wherein the fourth agent includes a second metal halide. The process also includes contacting the reaction product "D" with a fifth agent to form a Ziegler-Natta catalyst, wherein the fifth agent includes an organoaluminum compound.

In another embodiment, a process of forming a Ziegler Natta catalyst is disclosed. The process includes reacting a reaction mixture comprising magnesium ethoxide (Mg(OEt)$_2$), triethylaluminum (TEAl), 2-ethylhexanol (2-EHOH), and Ti(2-EHO$_4$) to form solution A and contacting solution A in hexane with a first agent to form a reaction product "A." The process also includes contacting the reaction product "A" with a second agent to form a reaction product "B", wherein the second agent includes a transition metal and a halogen. In addition, the process includes contacting the reaction product "B" with a third agent to form a reaction product "C", wherein the third agent includes a first metal halide. The process further includes contacting the reaction product "C" with a fourth agent to form a reaction product "D", wherein the fourth agent includes a second metal halide and contacting the reaction product "D" with a fifth agent to form a Ziegler-Natta catalyst, wherein the fifth agent includes an organoaluminum compound.

In another embodiment, a process of forming a Ziegler-Natta catalyst is disclosed. The process includes reacting a reaction mixture comprising magnesium ethoxide (Mg(OEt)$_2$), triethylaluminum (TEAl), and 2-ethylhexanol (2-EHOH) to form magnesium 2-ethyl hexyl alkoxide (Mg(2-EHO)$_2$) and contacting Mg(2-EHO)$_2$ in hexane with a chlorinated compound, to form a reaction product "A," wherein the chlorinated compound is represented by the formula ClA(O$_x$R$^4$)$_y$. A is selected from titanium, silicon, aluminum, carbon, tin and germanium. $R^4$ is selected from $C_1$ to $C_{10}$ alkyls. x is 0 or 1. y is the valence of A minus 1. The process also includes contacting the reaction product "A" with a titanium halide or titanium oxide to form a reaction product "B" and contacting the reaction product "B" with a metal halide to form a reaction product "C." In addition, the process includes contacting the reaction product "C" with a metal halide to form a reaction product "D" and contacting the reaction product "D" with an organoaluminum compound to form a Ziegler-Natta catalyst.

In another embodiment, a process of forming a Ziegler-Natta catalyst is disclosed. The process includes reacting a reaction mixture comprising magnesium ethoxide (Mg(OEt)$_2$), triethylaluminum (TEAl), 2-ethylhexanol (2-EHOH), and Ti(2-EHO$_4$) to form solution A and contacting solution A in hexane with a chlorinated compound, to form a reaction product "A," wherein the chlorinated compound is represented by the formula ClA(O$_x$R$^4$)$_y$. A is selected from titanium, silicon, aluminum, carbon, tin and germanium. $R^4$ is selected from $C_1$ to $C_{10}$ alkyls. x is 0 or 1. y is the valence of A minus 1. The process also includes contacting the reaction product "A" with a titanium halide or titanium oxide to form a reaction product "B" and contacting the reaction product "B" with a metal halide to form a reaction product "C." In addition, the process includes contacting the reaction product "C" with a metal halide to form a reaction product "D" and contacting the reaction product "D" with an organoaluminum compound to form a Ziegler-Natta catalyst.

DETAILED DESCRIPTION

Introduction and Definitions

A detailed description will now be provided. The following disclosure includes specific embodiments, versions and examples, but the disclosure is not limited to these embodiments, versions or examples, which are included to enable a person having ordinary skill in the art to make and use embodiments when the information in this disclosure is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

The term "substituted" refers to an atom, radical or group that replaces a hydrogen in a chemical compound.

The term "blend" refers to a mixture of compounds that are blended and/or mixed prior to contact with another compound.

As used herein, "polymer density" is measured via ASTM-D-1238.

As used herein, "melt flow index" is measured via ASTM-D-1238-E.

As used herein, "melt index ratio" is measured via ASTM-D-1238-F.

The term "equivalent" refers to a molar ratio of a component to a starting material. In certain embodiments of the present disclosure, magnesium ethoxide is the starting material.

As used herein, "molecular weight distribution" is the ratio of the weight average molecular weight to the number average molecular weight ($M_w/M_n$) of a polymer.

As used herein, "room temperature" includes a temperature of from about 20° C. to about 28° C. (68° F. to 82° F.) However, room temperature measurements generally do not include close monitoring of the temperature of the process and therefore such a recitation does not intend to bind the embodiments described herein to any predetermined temperature range. Furthermore, a temperature difference of a few degrees may not matter to the phenomenon disclosed, such as a preparation method.

Catalyst Systems

A specific example of a Ziegler-Natta catalyst includes a metal component represented by the formula:

$$MR^A_x;$$

wherein M is a transition metal, $R^A$ is a halogen, an alkoxy or a hydrocarboxyl group and x is the valence of the transition metal. For example, x may be from 1 to 4.

The transition metal may be selected from Groups IV through VIB (e.g., titanium, vanadium or chromium), for example. $R^A$ may be selected from chlorine, bromine, carbonates, esters, or alkoxy groups in one or more embodiments. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$.

Those skilled in the art will recognize that a catalyst may be "activated" in some way before it is useful for promoting polymerization. As discussed further below, activation may be accomplished by contacting the catalyst with a Ziegler-Natta activator (Z-N activator), which is also referred to in some instances as a "cocatalyst." Embodiments of such Z-N activators include organoaluminum compounds, such as trimethyl aluminum (TMA), triethyl aluminum (TEAl) and triisobutyl aluminum (TIBAl), for example.

The Ziegler-Natta catalyst system may further include one or more electron donors, such as internal electron donors and/or external electron donors. Internal electron donors may be used to reduce the atactic form of the resulting polymer, thus decreasing the amount of xylene solubles in the polymer. The internal electron donors may include amines, amides, esters, ketones, nitriles, ethers, phosphines, diethers, succinates, phthalates, or dialkoxybenzenes, for example. (See, U.S. Pat. No. 5,945,366 and U.S. Pat. No. 6,399,837, which are incorporated by reference herein.)

External electron donors may be used to further control the amount of atactic polymer produced. The external electron donors may include monofunctional or polyfunctional carboxylic acids, carboxylic anhydrides, carboxylic esters, ketones, ethers, alcohols, lactones, organophosphorus compounds and/or organosilicon compounds. In one embodiment, the external donor may include diphenyldimethoxysilane (DPMS), cyclohexymethyldimethoxysilane (CDMS), diisopropyldimethoxysilane and/or dicyclopentyldimethoxysilane (CPDS), for example. The external donor may be the same or different from the internal electron donor used.

The components of the Ziegler-Natta catalyst system (e.g., catalyst, activator and/or electron donors) may or may not be associated with a support, either in combination with each other or separate from one another. The support materials may include a magnesium dihalide, such as magnesium dichloride or magnesium dibromide, or silica, for example.

In certain embodiments of the present disclosure the reaction scheme for forming a Ziegler Natta catalyst may be illustrated as follows (referred to hereinafter as Reaction Scheme 1):

1) $Mg(OEt)_2 + TEAl + 2\text{-}EHOH \rightarrow Mg(2\text{-}EHO)_2$
2) $Mg(2\text{-}EHO)_2 + ClA(O_xR^4)_y \rightarrow \text{"A"}$
3) $\text{"A"} + TiCl_4/Ti(OR^5)_4 \rightarrow \text{"B"}$
4) $\text{"B"} + TiCl_4 \rightarrow \text{"C"}$
5) $\text{"C"} + TiCl_4 \rightarrow \text{"D"}$
6) $\text{"D"} + AlR^6_3 \rightarrow$ Catalyst wherein $Mg(2\text{-}EHO)_2$ represents magnesium 2-ethyl hexyl alkoxide, 2-EHOH represents 2-ethylhexanol, and $Mg(OEt)_2$ represents magnesium ethoxide.

In certain other embodiments of the present disclosure the reaction scheme for forming a Ziegler Natta catalyst may be illustrated as follows (referred to hereinafter as Reaction Scheme 2):

1) $Mg(OEt)_2 + TEAl + 2\text{-}EHOH + Ti(2\text{-}EHO)_4 \rightarrow$ "solution A"
2) "solution A" $+ ClA(O_xR^4)_y \rightarrow \text{"A"}$
3) $\text{"A"} + TiCl_4/Ti(OR^5)_4 \rightarrow \text{"B"}$
4) $\text{"B"} + TiCl_4 \rightarrow \text{"C"}$
5) $\text{"C"} + TiCl_4 \rightarrow \text{"D"}$
6) $\text{"D"} + AlR^6_3 \rightarrow$ Catalyst wherein $Ti(2\text{-}EHO)_4$ represent titanium 2-ethyl hexyl alkoxide.

In one or more embodiments, the reaction mixture in step 1) of Reaction Scheme 1 and Reaction Scheme 2 does not include butylethylmagnesiume (BEM).

While the primary reaction components are illustrated above in Reaction Scheme 1 and Reaction Scheme 2, additional components may be reaction products or used in such reactions and not illustrated above. Further, while described herein in terms of primary reaction steps, it is known to those skilled in the art that additional steps may be included in the reaction schemes and processes described herein (e.g., washing, filtering, drying or decanting steps), while other steps may be eliminated in certain embodiments. In addition, any of the agents described herein may be added in combination with one another so long as the order of addition complies with the spirit of the disclosure. For example, the third and fourth agents may be added to reaction product "B" at the same time to form reaction product "D".

In certain embodiments of the present disclosure, a soluble Mg solution may be formed in step 1) of Reaction Scheme 1 and Reaction Scheme 2, for instance, in the preparation of Ziegler-Natta catalysts with controlled morphology from precipitation. In certain non-limiting embodiments of the present disclosure, the solvent of the soluble Mg solution can be a hydrocarbon, such as, for instance, hexane. $Mg(OEt)_2$ is not soluble in certain hydrocarbons, such as hexane. In contrast $Mg(2\text{-}EHO)_2$ is soluble in hexane.

Reaction Scheme 1—Step 1)

In step 1) of Reaction Scheme 1, soluble $Mg(2\text{-}EHO)_2$ can be prepared by charging $Mg(OEt)_2$, TEAl and 2-EHOH to a reactor to form a mixture. The $Mg(OEt)_2$, TEAl and 2-EHOH can be charged to the reactor in any order. In certain embodiments of present disclosure, the TEAl is added to the 2-EHOH, followed by addition of the Mg $(OEt)_2$. Hexane may then be added to the mixture in the reactor as a solvent. The mixture can then be heated to obtain an $Mg(2\text{-}EHO)_2$/hexane solution. In one or more embodiments, the mixture may be heated at hexane reflux temperature to obtain the Mg(2-EHO)$_2$/hexane solution. For example, in one or more embodiments, the mixture can be heated at hexane reflux temperature in an oil bath at about 120° C. to obtain the Mg(2-EHO)$_2$/hexane solution. The mixture can be heated until a clear solution of the Mg(2-EHO)$_2$ in the hexane is obtained. In certain embodiments of the present disclosure, step 1) of the Reaction Scheme 1 is represented by Reaction Scheme A:

1) Mg(OEt)$_2$+0.25 equivalents of TEAl+2.75 equivalents of 2-EHOH Mg(2-EHO)$_2$ As one of ordinary skill in the art will appreciate, equivalents of TEAl and 2-EHOH may be modified depending upon need. As examples, the equivalents of TEAl may be modified to between 0.25 and 1 or between 0.25 and 0.5 and the equivalents of 2-EHOH may be modified to between 2.75 and 5 or between 2.75 and 3.5.

Reaction Scheme 2—Step 1)

In step 1) of Reaction Scheme 2, a solution containing Mg(2-EHO)$_2$ can be prepared by charging Mg(OEt)$_2$, TEAl, 2-EHOH and Ti(2-EHO)$_4$ to a reactor to form a mixture. The Mg(OEt)$_2$, TEAl, 2-EHOH and Ti(2-EHO)$_4$ can be charged to the reactor in any order. In certain embodiments of present disclosure, the TEAl is added to the 2-EHOH, followed by addition of the Mg(OEt)$_2$ and Ti(2-EHO)$_4$. Hexane may then be added to the mixture in the reactor as a solvent. The mixture can then be heated to obtain a viscous solution including Mg(2-EHO)$_2$. In one or more embodiments, the mixture may be mixed with hexane to dilute the solution.

The addition of the Ti(2-EHO)$_4$ can reduce or eliminate the formation of ethanol. The formation of ethanol, unless it is first converted to ethoxide, can generate HCl upon reaction with TiCl$_4$, which can reduce catalyst yield and severely corrode reactors. Therefore, the addition of the Ti(2-EHO)$_4$ can increase catalyst yield and minimize the reactor corrosion. In certain embodiments of the present disclosure, "solution A" contains no HCl.

In certain embodiments of the present disclosure, the reaction mixture of step 1) in Reaction Scheme 2 can also include titanium 2-ethyl hexyl alkoxide (referred to hereinafter as Ti(2-EHO)$_4$). In certain embodiments of the present disclosure, step 1) of the Reaction Scheme 2 is resented by the following Reaction Scheme B:

1) Mg(OEt)$_2$+0.25 equiv. TEAl+0.75 equiv. 2-EHOH+Ti(2-EHO)$_4$→solution A

In certain embodiments, the reaction mixture in step 1) of Reaction Scheme B includes 0.25 equivalents of the TEAl and 0.75 equivalents of the 2-EHOH. As one of ordinary skill in the art will appreciate, equivalents of TEAl and 2-EHOH may be modified depending upon need. As examples, the equivalents of TEAl may be modified to between 0.25 and 1 or between 0.25 and 0.5 and the equivalents of 2-EHOH may be modified to between 0.75 and 2 or between 0.75 and 1.5.

In one or more embodiments of step 1) in Reaction Scheme 2, the level of TEAl in the reaction mixture can be adjusted to control final catalyst morphology.

Steps 2 through 6

Mg(2-EHO)$_2$ solution can be contacted with a first agent to form reaction product "A", such as is shown in step 2) of Reaction Schemes 1 and 2. Such reaction may occur in the presence of an inert solvent.

The contact of the Mg(2-EHO)$_2$ with the first agent to form the reaction product "A" can occur at a temperature of from about 0° C. to about 100° C. or from about 20° C. to about 90° C., for example. The contact of the Mg(2-EHO)$_2$ with the first agent to form the reaction product "A" can occur for a time of from about 0.2 hours to about 24 hours or from about 1 hour to about 4 hours, for example.

Non-limiting examples of the first agent are generally represented by the following formula:

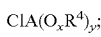

ClA(O$_x$R$^4$)$_y$;

wherein A is selected from titanium, silicon, aluminum, carbon, tin and germanium; R$^4$ is selected from C$_1$ to C$_{10}$ alkyls, such as methyl, ethyl, propyl and isopropyl; x is 0 or 1; and y is the valence of A minus 1. Non-limiting illustrations of first agents include chlorotitaniumtriisopropoxide ClTi(O$^i$Pr)$_3$ and ClSi(Me)$_3$, for example.

The method can include contacting reaction product "A" with a second agent to form reaction product "B", such as is shown in step 3) of Reaction Schemes 1 and 2. Such reaction may occur in the presence of an inert solvent. The inert solvent may include any solvent previously discussed herein, for example.

The contacting of reaction product "A" with the second agent to form the reaction product "B" can occur at a temperature of from about 0° C. to about 100° C. or from about 20° C. to about 90° C., for example. The contacting of reaction product "A" with the second agent to form the reaction product "B" can occur for a time of from about 0.2 hours to about 36 hours or from about 1 hour to about 4 hours, for example.

The second agent may be added to reaction product "A" in an equivalent of from about 0.5 to about 5, from about 1 to about 4, or from about 1.5 to about 2.5, for example.

The second agent can include a titanium halide and a titanium alkoxide. The second agent may be represented by the following formula:

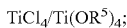

TiCl$_4$/Ti(OR$^5$)$_4$;

wherein R$^5$ is selected from C$_2$ to C$_{20}$ alkyl groups. Non-limiting illustrations of second agents include blends of titanium chloride and titanium alkoxides, such as TiCl$_4$/Ti(OBu)$_4$ (titanium butoxide). The blends may have an equivalent of TiCl$_4$:Ti(OR$^5$)$_4$ of from about 0.5 to about 6 or from about 2 to about 3, for example.

The method may include contacting reaction product "B" with a third agent to form reaction product "C", such as is shown in step 4) of Reaction Schemes 1 and 2. Such reaction may occur in the presence of an inert solvent. The inert solvent may include any solvent previously discussed herein, for example.

The contacting of reaction product "B" with the third agent to form reaction product "C" may further occur at room temperature, for example.

Non-limiting illustrations of third agents include metal halides. The metal halides may include any metal halide known to one skilled in the art, such as titanium tetrachloride (TiCl$_4$), for example. The third agent may be added in an equivalent of from about 0.1 to about 5, from about 0.25 to about 4, or from about 0.45 to about 2.5, for example.

The method may further include contacting reaction product "C" with a fourth agent to form reaction product "D", such as is shown in step 5) of Reaction Schemes 1 and 2. Such reaction may occur in the presence of an inert solvent. The inert solvent may include any solvent previously discussed herein, for example.

The contacting of reaction product "C" with the fourth agent to form reaction product "D" may further occur at room temperature, for example.

The fourth agent may be added to the reaction product "C" in an equivalent of from about 0.1 to about 5, from about 0.25 to about 4, or from about 0.45 to about 2.0, for example.

Non-limiting illustrations of fourth agents include metal halides. The metal halides may include any metal halide previously described herein.

The method may include contacting reaction product "D" with a fifth agent to form the catalyst component, such as is shown in step 6) of Reaction Schemes 1 and 2.

The fifth agent may be added to the reaction product "D" in an equivalent of from about 0.1 to about 2 or from 0.5 to about 1.2, for example.

Non-limiting illustrations of fifth agents include organoaluminum compounds. The organoaluminum compounds may include aluminum alkyls having the following formula:

$$AlR^6{}_3;$$

wherein $R^6$ is a $C_1$ to $C_{10}$ alkyl compound. Non-limiting illustrations of the aluminum alkyl compounds generally include trimethyl aluminum (TMA), triisobutyl aluminum (TIBAl), triethyl aluminum (TEAl), n-octyl aluminum and n-hexyl aluminum, for example.

As illustrated above, the first agent and the second agent generally include blends of compounds. Unfortunately, such blends are specialty chemicals having a high production cost.

Therefore, one or more embodiments can include modifying/removing the blended agents to reduce production cost, while retaining one or more of the beneficial properties obtained via blends.

In an embodiment, the first agent can include a plurality of first agents (i.e., not a blend). The plurality of first agents can include at least a first compound and a second compound. In an embodiment, the first compound and second compound can be added to the magnesium dialkoxide compound at approximately the same time. In another embodiment, the first compound can be added to the magnesium dialkoxide compound prior to contact with the second compound. In an embodiment, the second compound can be added to the magnesium dialkoxide compound prior to contact with the first compound.

The second compound may be added in an equivalent of from about 0.1 to about 0.5 or about 0.25, for example, while the first compound may be added in an amount of 1 minus the equivalent of the second compound, for example. In one specific, non-limiting embodiment, the second compound can be added in an equivalent of 0.25 and the first compound can be added in an equivalent of 0.75, for example.

The second compound may include a metal halide, for example. The metal halide may include any metal halide known to one skilled in the art, such as titanium tetrachloride ($TiCl_4$), for example.

The second compound may include a compound having the formula $A(O_xR^4)_y$, such as $Ti(O^iPr)_4$, for example.

In a non-limiting embodiment, the second compound is a metal halide and the first compound is represented by the formula $A(O_xR^4)_y$. In the formula $A(O_xR^4)_y$, A can be selected from titanium, silicon, aluminum, carbon, tin and germanium; $R^4$ can be elected from $C_1$ to $C_{10}$ alkyls; x can be 0 or 1; and y can be the valence of A.

In one non-limiting embodiment, the second compound is $TiCl_4$ and the first compound is titanium isopropoxide.

Alternatively, or in addition, one or more embodiments include modifying and/or removing the blended second agent.

In such an embodiment, the second agent can include a plurality of second agents (i.e., not a blend). The plurality of second agents can generally include at least a third compound and a fourth compound. In one embodiment, the third compound and the fourth compound can be added to the reaction product "A" at approximately the same time. In another embodiment, the third compound can be added to the reaction product "A" prior to contact with the fourth compound. In yet another embodiment, the fourth compound can be added to the reaction product "A" prior to contact with the third compound.

The third compound may be added in an equivalent of from about 0.1 to about 3, from about 0.5 to about 2, or from about 0.75 to about 1.25, for example. The fourth compound may be added in an equivalent of from about 1.5 to about 3.5 or from about 1.75 to about 2.25, for example.

The third and fourth compounds may contact reaction product "A" at a reaction temperature of from about room temperature to about 60° C., for example. In one embodiment, the reaction temperature can be about 45° C., for example.

The third compound may include a compound represented by the formula $Ti(OR^5)_4$, wherein $R^5$ is selected from alkyl groups, such as butyl, for example.

The fourth compound may include a metal halide, such as titanium tetrachloride, for example.

Upon formation, the catalyst may optionally be subjected to heat treating. Such heat treating generally includes heating the catalyst to a temperature in the range of from about 40° C. to about 150° C., from about 90° C. to about 125° C., from about 40° C. to about 60° C., for example. Such heat treatment may occur for a time of from about 0.5 hours to about 24 hours or from about 1 hour to about 4 hours, for example.

Polymerization Processes

Catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. Other monomers include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, styrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, from about 200 psig to about 400 psig, or from about 250 psig to about 350 psig, for example. The reactor temperature in a gas phase process may vary from about 30° C. to about 120° C., from about 60° C. to about 115° C., from about 70° C. to about 110° C., or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process. However, a process may be a bulk process, a slurry process or a bulk slurry process, for example.

In a specific embodiment, a slurry process or a bulk process may be carried out continuously (in series, parallel or combinations thereof) in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 45 bar and a temperature of from about 38° C. to about 121° C., for example. Reaction heat may be removed through the loop wall via any method known to one skilled in the art, such as via a double-jacketed pipe.

Alternatively, other types of polymerization processes may be used, such stirred reactors in series, parallel or combinations thereof, for example. Upon removal from the reactor, the polymer may be passed to a polymer recovery system for further processing, such as addition of additives and/or extrusion, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene (e.g., syndiotactic, atactic and isotactic) and polypropylene copolymers, for example.

In one embodiment, ethylene based polymers may have a density of from about 0.86 g/cc to about 0.978 g/cc, from about 0.88 g/cc to about 0.965 g/cc, from about 0.90 g/cc to about 0.96 g/cc, or from about 0.91 g/cc to about 0.94 g/cc, for example.

Such ethylene based polymers may have a molecular weight distribution of at least 4 or at least 5, for example.

The ethylene based polymers may have a melt strength of from about 6.5 cN to about 11 cN, from about 7 cN to about 11 cN, or from about 7 cN to about 10 cN, for example.

The ethylene polymers may have a melt flow index (MFI) of from about 0.01 dg/min to about 1000 dg/min., from about 0.01 dg/min. to about 100 dg/min., from about 0.02 dg/min. to about 50 dg/min. or from about 0.03 dg/min. to about 0.1 dg/min, for example.

The ethylene based polymers may have a melt index ratio $I_{21}$ of at least about 20, at least about 30, at least about 40, at least about 50, or at least about 55, for example.

Product Application

The polymers and blends thereof can be useful in applications known to one skilled in the art, such as forming operations (e.g., film, sheet, pipe and fiber extrusion and co-extrusion as well as blow molding, injection molding and rotary molding). Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers operations include melt spinning, solution spinning and melt blown fiber operations for use in woven or non-woven form to make filters, diaper fabrics, medical garments and geotextiles, for example. Extruded articles include medical tubing, wire and cable coatings, geomembranes and pond liners, for example. Molded articles include single and multi-layered constructions in the form of bottles, tanks, large hollow articles, rigid food containers and toys, for example.

While the foregoing is directed to embodiments of the present disclosure, other and further embodiments of the disclosure may be devised without departing from the basic scope thereof and the scope thereof is determined by the claims that follow.

What is claimed is:

1. A process of forming a Ziegler Natta catalyst comprising:

reacting a reaction mixture comprising magnesium ethoxide ($Mg(OEt)_2$), triethylaluminum (TEAl), and 2-ethylhexanol (2-EHOH) to form magnesium 2-ethyl hexyl alkoxide ($Mg(2-EHO)_2$);

contacting $Mg(2-EHO)_2$ in hexane with a first agent to form a reaction product "A" wherein the first agent the first agent is represented by the formula:

$ClA(O_xR^4)_y$;

wherein A is selected from titanium, silicon, aluminum, carbon, tin and germanium; $R^4$ is selected from C1 to C10 alkyls; x is 0 or 1; and y is the valence of A minus 1;

contacting the reaction product "A" with a second agent to form a reaction product "B", wherein the second agent includes a transition metal and a halogen;
contacting the reaction product "B" with a third agent to form a reaction product "C", wherein the third agent includes a first metal halide;
contacting the reaction product "C" with a fourth agent to form a reaction product "D", wherein the fourth agent includes a second metal halide; and
contacting the reaction product "D" with a fifth agent to form a Ziegler-Natta catalyst, wherein the fifth agent includes an organoaluminum compound.

2. The process of claim 1, wherein the reaction mixture further comprises hexane.

3. The process of claim 1, wherein the step of reacting a reaction mixture further comprises:
heating the mixture.

4. The process of claim 3, wherein the reaction mixture is heated at a hexane reflux temperature.

5. The process of claim 1, wherein the TEAl is present in the reaction mixture in a molar equivalent of between 0.25 and 1 relative to the Mg(OEt)$_2$, and the 2-EHOH is present in the reaction mixture in a molar equivalent of between 2.75 and 3.5 relative to the Mg(OEt)$_2$.

6. The process of claim 1, wherein the reaction mixture does not include butylethylmagnesium (BEM).

7. A method of forming a polyolefin comprising:
contacting the Ziegler-Natta catalyst of claim 1 with an olefin monomer to form a polyolefin.

8. A process of forming a Ziegler Natta catalyst comprising:
reacting a reaction mixture comprising magnesium ethoxide (Mg(OEt)$_2$), triethylaluminum (TEAl), 2-ethylhexanol (2-EHOH), and titanium 2-ethyl hexyl alkoxide (Ti(2-EHO$_4$)) to form solution A;
contacting solution A in hexane with a first agent to form a reaction product "A", wherein the first agent the first agent is represented by the formula:

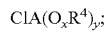

wherein A is selected from titanium, silicon, aluminum, carbon, tin and germanium; R$^4$ is selected from C$_1$ to C$_{10}$ alkyls; x is 0 or 1; and y is the valence of A minus 1;
contacting the reaction product "A" with a second agent to form a reaction product "B", wherein the second agent includes a transition metal and a halogen;
contacting the reaction product "B" with a third agent to form a reaction product "C", wherein the third agent includes a first metal halide;
contacting the reaction product "C" with a fourth agent to form a reaction product "D", wherein the fourth agent includes a second metal halide; and
contacting the reaction product "D" with a fifth agent to form a Ziegler-Natta catalyst, wherein the fifth agent includes an organoaluminum compound.

9. The process of claim 8, wherein solution A does not include HCl.

10. The process of claim 8, wherein the reaction mixture does not include butylethylmagnesium (BEM).

11. The process of claim 8, wherein the TEAl is present in the reaction mixture in a molar equivalent of between 0.25 and 1 relative to the Mg(OEt)$_2$, and the 2-EHOH is present in the reaction mixture in a molar equivalent of between 0.75 and 2 relative to the Mg(OEt)$_2$.

12. The process of claim 8, wherein the reaction mixture further comprises hexane.

13. The process of claim 12, wherein the step of reacting a reaction mixture further comprises:
heating the mixture.

14. The process of claim 13, wherein the reaction mixture is heated at a hexane reflux temperature.

15. A method of forming a polyolefin comprising:
contacting the Ziegler-Natta catalyst of claim 8 with an olefin monomer to form a polyolefin.

16. A process of forming a Ziegler-Natta catalyst comprising:
reacting a reaction mixture comprising magnesium ethoxide (Mg(OEt)$_2$), triethylaluminum (TEAl), and 2-ethylhexanol (2-EHOH) to form magnesium 2-ethyl hexyl alkoxide (Mg(2-EHO)$_2$);
contacting Mg(2-EHO)$_2$ in hexane with a chlorinated compound, to form a reaction product "A," wherein the chlorinated compound is represented by the formula:

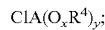

wherein A is selected from titanium, silicon, aluminum, carbon, tin and germanium; R$^4$ is selected from C$_1$ to C$_{10}$ alkyls; x is 0 or 1; and y is the valence of A minus 1;
contacting the reaction product "A" with a titanium halide or titanium oxide to form a reaction product "B";
contacting the reaction product "B" with a metal halide to form a reaction product "C";
contacting the reaction product "C" with a metal halide to form a reaction product "D"; and
contacting the reaction product "D" with an organoaluminum compound to form a Ziegler-Natta catalyst.

17. A process of forming a Ziegler Natta catalyst comprising:
reacting a reaction mixture comprising magnesium ethoxide (Mg(OEt)$_2$), triethylaluminum (TEAl), 2-ethylhexanol (2-EHOH), and titanium 2-ethyl hexyl alkoxide (Ti(2-EHO$_4$)) to form solution A;
contacting solution A in hexane with a chlorinated compound, to form a reaction product "A," wherein the chlorinated compound is represented by the formula:

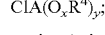

wherein A is selected from titanium, silicon, aluminum, carbon, tin and germanium; R$^4$ is selected from C$_1$ to C$_{10}$ alkyls; x is 0 or 1; and y is the valence of A minus 1;
contacting the reaction product "A" with a titanium halide or titanium oxide to form a reaction product "B";
contacting the reaction product "B" with a metal halide to form a reaction product "C";
contacting the reaction product "C" with a metal halide to form a reaction product "D"; and
contacting the reaction product "D" with an organoaluminum compound to form a Ziegler-Natta catalyst.

* * * * *